Dec. 23, 1952     E. I. GHORMLEY     2,622,618
ELECTROMAGNETICALLY CONTROLLED VALVE
Filed Jan. 21, 1949
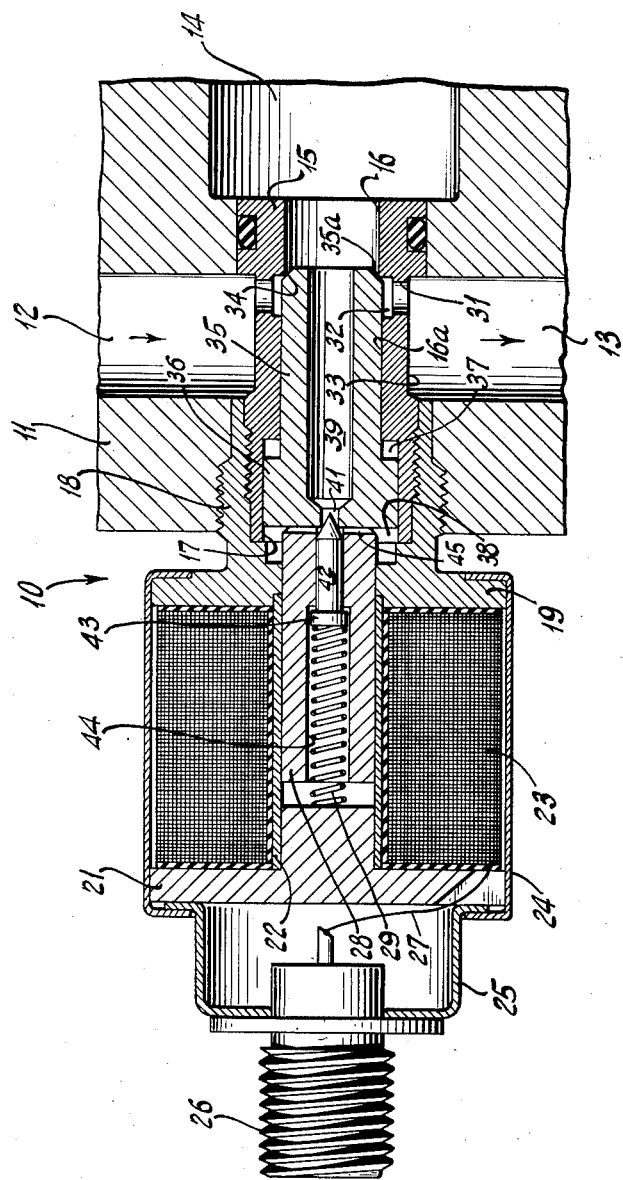
INVENTOR
EDWIN I. GHORMLEY.
BY
His ATTORNEY Patented Dec. 23, 1952

2,622,618

UNITED STATES PATENT OFFICE 2,622,618

ELECTROMAGNETICALLY CONTROLLED VALVE

Edwin I. Ghormley, Dayton, Ohio, assignor to United Aircraft Products, Inc., Dayton, Ohio, a corporation of Ohio Application January 21, 1949, Serial No. 71,899

5 Claims. (Cl. 137—657)

This invention relates to pressure fluid operated electromagnetically controlled valves.

Devices of this kind are particularly useful in aircraft since they present a means for effecting remote control operation of a valve, and have such positive action that misoperation or disarrangement of the parts due to vibration is unlikely. The device comprises a unitary structure, including an electromagnet assembly and a valve assembly, constructed and arranged to be interposed in a pressure fluid distributing system in such wise as to divert the fluid flow from its normal path, or to permit by-passing thereof in response to energizing of the electromagnet. The valve assembly includes a main valve element for controlling the fluid flow, a pressure fluid operated piston for shifting the valve element to open and closed positions, which piston normally is balanced against the effects of fluid pressure, a vent passage for creating an unbalance of the pressures acting upon the piston, and a pilot valve operated by the electromagnet for controlling flow through the vent passage.

In the design of these valve structures, it has been the object to reduce their construction and operation to the simplest of terms, and to lessen the weight thereof in order that they may be more suitable for aircraft use. It is thought that in the instant invention, this design objective has been attained in higher degree than heretofore. The invention contemplates a construction characterized by relative smallness of size, lightness of weight, and by a relatively small number of moving parts. In the latter connection, it is proposed to utilize a single spring to perform the several functions of extending the electromagnetic plunger, closing the pilot valve, and urging the main control valve element to its initial or normal position. The adapting of the valve for use of such a spring, and the resulting increase in compactness, ease of assembly, and efficiency of operation, is a feature of the invention.

Other objects and structural details of the invention will appear from the following description when read in connection with the accompanying drawing, which is a view of the valve mechanism of the invention in longitudinal section.

Referring to the drawing, a valve device in accordance with the present invention is there shown in a typical installation. As indicated therein, the valve device, which is indicated generally by the reference numeral 10, is shown mounted in a body 11 intersected by a pressure fluid conducting passageway, which, for purposes of this description, may be considered to comprise an inlet passage 12 and an outlet passage 13. It will be understood that the passage 12 communicates with a source of fluid under pressure, for example with the fuel pump in an aircraft engine assembly, and that the outlet passage 13 leads to a place of utilization of the pressure fluid, for example an aircraft engine burner. The body 11 further includes a chamber 14 representing the low pressure side of the system, communicating, for example, with the source of passage 12.

The body 11 is bored to accommodate the valve mechanism 10 which is arranged perpendicular to the plane of the passages 12 and 13, and axially of the chamber 14 in a manner to communicate the high pressure passageway 12—13 with the low pressure chamber 14 through the valve mechanism 10. The control valve 10 comprises a cylindrical bushing 15 presenting a through longitudinal bore 16, a first counterbore 16a and a second counterbore 17, the counterbores opening through the left hand or outer end of the bushing 15. The bushing 15 is externally threaded adjacent its outer end for cooperative engagement with a tubular projection 18 which, in turn, has a screw-threaded engagement in the body 11. Tubular projection 18 forms a part of the electromagnet assembly of the device, being an integrally formed extension of a plate 19 constituting one end of the electromagnet spool. The spool further comprises an oppositely disposed end plate 21 and an interconnecting sleeve 22 upon which a coil 23 is wound. The plates 19 and 21 are surrounded by a casing 24 having a lapped connection with a cap 25. The cap 25 provides a mounting for a connector 26 through which electrical leads 27 extend into the unit where they are joined to coil 23. A plunger 28, slidably mounted in the sleeve 22, operates as the core of the electromagnet, and, together with a spring 29 acting upon the plunger in a direction to urge it outwardly, completes the construction of the electromagnet assembly.

The cylindrical bushing 15, which is rigidly held and supported by the tubular projection 18, extends through the bored interior of the body 11 and is interposed between the pressure fluid conducting inlet passage 12 and outlet passage 13. The longitudinal bore 16 of the bushing 15 opens into and communicates with the low pressure chamber 14. Adjacent the inner end of the bushing 15, or that end opening into chamber 14, there is formed a series of radial ports 31 opening at their one sides into an internal groove 32 in bushing 15, and at their other sides into an external peripheral groove 33 in bushing 15. The construction and arrangement of the valve body is such as to place the peripheral groove 33 thereon in registry with the inlet and outlet pressure fluid passages 12 and 13. Accordingly, the fluid flowing through passage 12 is free to go around valve bushing 15 by way of groove 33 and continue along outlet passage 13. At the same time, however, fluid flow is permitted through the radial ports 31 to longitudinal bore 16 where it may pass to the low pressure chamber 14.

The bottom of counterbore 16a lies in a transverse plane inwardly of the plane of radial ports 31. In conjunction with bore 16, the bottom of counterbore 16a defines a ledge 34 serving as a valve seat. Reciprocable within the counterbore 16a is a piston 35, the inner end of which is chamfered to serve as a valve 35a adapted to rest upon seat 34 in such manner as to close communication between the radial ports 31 and the inner end of bore 16, and, accordingly, to prevent flow between the pressure fluid conducting passages 12—13 and low pressure chamber 14.

At its outer end, the piston 35 is formed with a head 36 slidably mounted in the counterbore 17, the head 36 defining in counterbore 17 inner and outer pressure chambers 37 and 38 respectively. Pressure chamber 38 is formed by the piston head 36 in conjunction with tubular projection 18 and end plate 19 of the electromagnet assembly. The plate 19 further provides a bearing for the plunger 28 which extends through and beyond the plate into the pressure chamber 38. The piston 35 and its head 36 have a relatively loose fit in their respective counterbores 16a and 17 designed to permit a limited flow of pressure fluid from the ports 31 to the pressure chamber 37 and from thence to the pressure chamber 38. Inasmuch as pressure fluid is continuously admitted through ports 31 to annular groove 32, a pressure is established in chambers 37 and 38 corresponding to the system pressure. In the chamber 38, the fluid pressure is free to act substantially over the entire area of the head 36 whereas the pressure in chamber 37 is restricted to an annular area represented by the difference in diameter between the piston 35 and the head 36. The pressure in chamber 38, accordingly, is the dominant pressure and its resultant force is effective to urge the piston assembly inward or in a direction to engage valve seat 34 and prevent flow to chamber 14 through the open inner end of valve body 15.

The piston assembly 35—36 contains a longitudinal bore 39 opening through the inner end thereof into bore 16 and low pressure chamber 14. At the outer end of the piston assembly, bore 39 is connected to pressure chamber 38 by an orifice 41. Through orifice 41, pressure fluid in chamber 38 may be permitted to pass to bore 39 and low pressure chamber 14. Thus, when orifice 41 is open, the fluid pressure in chamber 37 assumes a dominant relation to the pressure in chamber 38 and is exerted in a direction to move piston 36 outward in counterbore 17 and to shift piston 35 to move valve 35a off seat 34. The orifice 41 is controlled by a needle valve 42 carried in and extending through a longitudinal bore in plunger 28. The valve 42 has a head 43 thereon received in counterbore 44 in plunger 28 into which extends the aforementioned spring 29. Spring 29 presses upon the head 43 of the pilot valve 42 and urges both the plunger 28 and the pilot valve inward or in a direction to cause the needle-like end of the pilot valve to enter within and close orifice 41. The adjacent end of plunger 28 may engage piston head 36, but flow within the chamber 38 to orifice 41 is permitted by means of a transverse slot 45 in the end of plunger 28.

In the operation of the valve mechanism, the parts normally assume the positions illustrated. Thus, the solenoid coil 28 is deenergized and spring 29 is free to press the plunger 28 and pilot valve 42 outward into cooperative relation with piston head 36 in a manner to close orifice 41 and to assist fluid pressure in chamber 38 in maintaining valve 35a in a closed position upon seat 34. At this time, therefore, fluid flow takes place in the system through passages 12 and 13 to the exclusion of the bypass represented by ports 31, bore 16, and chamber 14. By reason of the loose fit of piston assembly 35—36 in the body 15, the pressure chambers 37 and 38 are connected to the high pressure source and the valve 35a is substantially balanced in closed position. When the coil 23 is energized, the plunger 28 is withdrawn against the urging of spring 29. In so moving, the plunger retracts pilot valve 42 out of and away from its position closing orifice 41 and releases the piston assembly 35—36 for outward travel. In response to opening of the pilot valve 42, the pressure in chamber 38 is permitted to escape through orifice 41 to bore 39 and chamber 14. The rate of flow through the orifice 41 exceeds the rate of flow taking place between chamber 37 and 38 around the piston head 36 so that the pressure exerted in chamber 37 is effective to move piston head 36 outward, drawing the valve 35a off of seat 34. So long as the solenoid coil 23 remains energized, this condition and position of the parts will prevail, and, as a result thereof, the supply passage 12 is connected to the low pressure chamber 14. Some or all of the pressure fluid flowing therein, accordingly, will be diverted to the low pressure side of the system. When the coil 23 is deenergized, the plunger 28 and pilot valve 42 are returned by spring 29 to engagement with piston head 36, the pilot valve 42 entering and closing orifice 41. The escape of pressure fluid from chamber 38 thereby is cut off, and, as the pressure in that chamber rises by reason of continued flow from chamber 37, a pressure value quickly is attained therein which is operative or effective in conjunction with the force exerted by spring 29 to move the piston assembly 35—36 inward to close valve 35a.

What is claimed is:

1. An electromagnetically controlled fluid pressure operated valve, comprising an electromagnet including a reciprocable plunger and a spring urging said plunger outward, a tubular projection on said electromagnet into which said plunger extends, a cylindrical valve body secured to said tubular projection and presenting a longitudinal bore therethrough and a counterbore in the outer end thereof facing said electromagnet, a piston in said counterbore and defining pressure chambers therein on opposite sides of said piston, a vent passage through said piston for the escape of fluid from the outer one of said pressure chambers, radial ports in said valve body to communicate said longitudinal bore with a source of pressure fluid, a valve slidably mounted in said longitudinal bore and connected to said piston, a seat for said valve defined in said longitudinal bore between said radial ports and the inner end of said body, said valve being shiftable to and from a position upon said seat in response to relatively overbalancing pressures in said pressure chambers acting upon said piston, means for supplying fluid pressure to said pressure chambers from said radial ports the supply of fluid to the outer pressure chamber being so restricted as to predicate overbalancing when the vent passage is opened, and a pilot valve carried by said electromagnet plunger to close and open said vent passage through said piston.

2. An electromagnetically controlled fluid pressure operated valve, comprising an electromagnet including a reciprocable plunger and a spring urging said plunger outward, a tubular projection on said electromagnet into which said plunger extends, a cylindrical valve body secured to said tubular projection and presenting a longitudinal bore therethrough and a counterbore in the outer end thereof facing said electromagnet, a piston in said counterbore and defining pressure chambers therein on opposite sides of said piston, a vent passage through said piston for the escape of fluid from that pressure chamber facing said electromagnet, means for supplying pressure fluid to said pressure chambers, the supply of pressure fluid to the said pressure chamber facing said electromagnet being restricted so as to predicate an unbalanced condition of said piston when said vent passage is open, a pilot valve carried by said plunger and arranged to open and close said vent passage, said spring working through said plunger to move said pilot valve to closed position, the energizing of said electromagnet serving to retract said plunger against the action of said spring to move said valve to open position and release said piston for outward motion in said counterbore toward said electromagnet, and a fluid flow control valve connected to said piston for sliding motion in said longitudinal bore, and parts in said body controlled by said control valve.

3. A valve according to claim 2, characterized in that said ports are radial ports in said body in continuous communication with said longitudinal bore, said control valve and said piston having a loose fit in said body providing for restricted fluid flow from said radial ports to said pressure chambers.

4. A fluid pressure operated valve, comprising a cylindrical body open at both ends and having first and second counterbores, said first counterbore defining an internal valve seat adjacent the inner end of said body and said second counterbore defining a piston chamber at the outer end of said body; a piston having a loosely sliding fit in said chamber and defining inner and outer pressure chambers therein on opposite sides thereof, said chambers being in restricted communication with one another around said piston; an extension on said piston having a loosely sliding fit in said body and terminating in a valve to engage said valve seat; a radial fluid flow connection in said body intermediate said valve seat and said piston chamber providing for transverse fluid flow around said piston extension, there being continuous restricted communication along said piston extension to said inner pressure chamber and around said piston to said outer pressure chamber, the effective areas of said piston being unbalanced by reason of said extension tending to create an overbalancing pressure in said outer chamber urging said piston inward or in a direction to engage said valve on said seat and thereby deny communication of said radial connection with the open inner end of said body; a relatively unrestricted passage through said piston and piston extension to vent said outer pressure chamber through the open inner end of said body; a closure for the outer open end of said body; and a pilot valve carried by said closure alternatively to open and close said passage, said passage when open creating an overbalancing pressure in said inner pressure chamber urging said piston outward or in a direction to disengage the first said valve from said valve seat and permit communication of said radial connection with the open inner end of said body.

5. A pressure fluid operated valve according to claim 4, characterized in that said closure is an electromagnet interconnected in unitary relation with said body and having a reciprocable core and a spring acting to cause movement of said core in a direction opposite to the direction of movement of the core due to energizing of the electromagnet, the reciprocable core of said electromagnet carrying said pilot valve.

EDWIN I. GHORMLEY.

REFERENCES CITED

The following references are of record in the file of this patent:

UNITED STATES PATENTS

| Number | Name | Date |
|---|---|---|
| 1,157,870 | Houser | Oct. 26, 1915 |
| 1,807,191 | Boyle | May 26, 1931 |
| 2,204,808 | McNeal | June 18, 1940 |
| 2,294,702 | Van Der Werff | Sept. 1, 1942 |
| 2,296,713 | Hench | Sept. 22, 1942 |
| 2,345,306 | Van Der Werff | Mar. 28, 1944 |